(12) United States Patent
Lesser

(10) Patent No.: US 11,490,993 B2
(45) Date of Patent: Nov. 8, 2022

(54) ELASTIC MATRIX BAND

(71) Applicant: Robyn B. Lesser, Clearwater, FL (US)

(72) Inventor: Robyn B. Lesser, Clearwater, FL (US)

(73) Assignee: SMILE BUILDERS INNOVATIONS LLC, Tampa, FL (US)

( * ) Notice: Subject to any disclaimer, the term of this patent is extended or adjusted under 35 U.S.C. 154(b) by 0 days.

(21) Appl. No.: 17/113,488

(22) Filed: Dec. 7, 2020

(65) Prior Publication Data

US 2022/0175490 A1    Jun. 9, 2022

(51) Int. Cl.
*A61C 5/85* (2017.01)

(52) U.S. Cl.
CPC .......... *A61C 5/85* (2017.02); *A61C 2201/007* (2013.01)

(58) Field of Classification Search
CPC ...................................... A61C 5/85
See application file for complete search history.

(56) References Cited

U.S. PATENT DOCUMENTS

| | | | | |
|---|---|---|---|---|
| 4,704,087 A | * | 11/1987 | Dragan | A61C 5/85 433/39 |
| D297,362 S | * | 8/1988 | Dragan | D24/181 |
| 5,342,194 A | * | 8/1994 | Feldman | A61C 5/77 433/229 |
| 6,619,956 B1 | * | 9/2003 | Weir | A61C 5/85 433/149 |
| 2020/0315742 A1 | * | 10/2020 | Lesser | A61C 5/85 |
| 2021/0322135 A1 | * | 10/2021 | Thai | A61C 5/85 |

FOREIGN PATENT DOCUMENTS

WO    WO-2006011003 A1 *    2/2006    ............. A61C 5/125

\* cited by examiner

*Primary Examiner* — Ralph A Lewis
(74) *Attorney, Agent, or Firm* — Thomas | Horstemeyer, LLP

(57) ABSTRACT

An elastic matrix band for use during a dental restoration process is provided. In one embodiment, among others, the matrix band may include an elastic circular band that has a first end and a second end. The elastic circular band includes an opening at the second end, and the first end has a larger diameter than the second end. The elastic circular band is configured to expand in order to situate the elastic circular band around a tooth and contract in order to adhere to the tooth. Additionally, the elastic circular band comprises a ridge that is positioned between the first end and the second end.

19 Claims, 11 Drawing Sheets

ELASTIC MATRIX BAND

BACKGROUND

Dental restoration on certain teeth can be technique sensitive. Dentists have to maintain a dry and clean field while also shaping and restoring a tooth's anatomy. Depending on the tooth, dentists oftentimes use a matrix, stabilizer, and a wedge during a dental restoration procedure. However, these dental tools and others can be problematic in certain scenarios.

SUMMARY

Embodiments of the present disclosure are related to an improved dental matrix band for dental restoration procedures on primary or deciduous and secondary or permanent posterior and anterior teeth. In one non-limiting example, among others, an apparatus comprises an elastic circular band that has a first end and a second end. The elastic circular band includes an opening at the second end. The first end can have a larger diameter than the second end. The elastic circular band can be configured to expand in order to situate the elastic circular band around a tooth and contract in order to adhere to the tooth. The elastic circular band includes a ridge that is positioned between the first end and the second end of the elastic circular band.

In some embodiments, the ridge comprises a first ridge, and the apparatus further comprises a second ridge at the first end. Additionally, when the elastic circular band can be positioned around the tooth, the first ridge can contact an adjacent tooth at a first location of the adjacent tooth, and the second ridge contacts the adjacent tooth at a second location of the adjacent tooth.

In some embodiments, when the elastic circular band is positioned around the tooth, the ridge is configured to displace or move an adjacent tooth away from the tooth. When the elastic circular band is positioned around the tooth, the elastic circular band is configured to provide a fluid seal around the tooth.

In some embodiments, a first thickness of the first end of the elastic circular band is greater than a second thickness of the second end of elastic circular band. Additionally, when the elastic circular band is positioned around the tooth, the elastic circular band can conform to a shape of the tooth. In addition, the ridge can comprise a slanted surface that extends from the second end. In some embodiments, the slanted surface is a first slanted surface, and the ridge comprises a second slanted surface that has a different slope than the first slanted surface.

In some embodiments, the elastic circular band can have a tapered shape. The second end can comprise a tapered end, and when the elastic circular band is positioned around the tooth, the tapered end is configured to be positioned substantially at or below a gum line at the tooth. In some embodiments, the opening can extend from the second end to the first end. Further, in another embodiment, the tooth is a posterior tooth or an anterior tooth.

In some embodiments, the elastic circular band has a recessed surface between the ridge and the first end. Further, the elastic circular band can be comprised of at least one of latex, silicone, polyethylene, polyvinyl chloride, polyurethane, thermal plastic rubber, and thermoplastic polyurethane.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
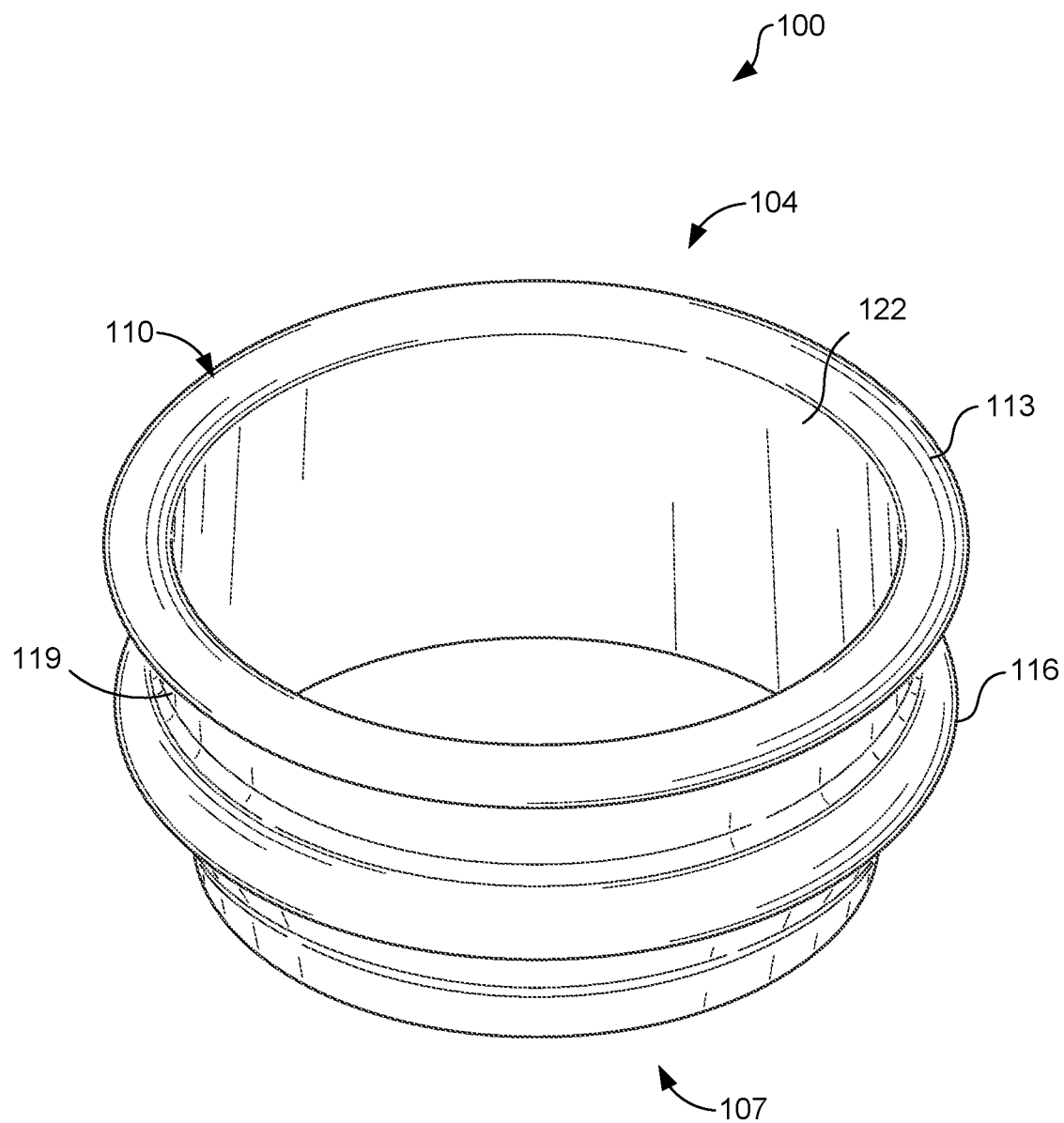
FIG. 1A is a first perspective view of a matrix band, according to one embodiment described herein.

Dental restoration involves a process for restoring the function, integrity, and esthetics of teeth. During restoration procedures, dentists use an array of tools to maintain a dry and clean field while shaping and restoring a tooth's anatomy. Depending on the tooth being operated on, certain tools and restoration techniques may be required during a restoration procedure. For example, dentists oftentimes use different techniques and tools for posterior teeth and anterior teeth.

Resin or glass ionomer restorations can be more affective when they are not contaminated by saliva and or blood. This can be difficult when restoring the interproximal surface (mesial or distal) of a tooth. Oftentimes, a matrix is used if the teeth are in contact with the proximal tooth. The matrix can enable the dentist to shape or mold the material with instruments, and the matrix prevents the materials from bonding to the adjacent tooth. The bonding materials used may include composite resins (whether packable or flowable), compomers, and glass ionomers.

Generally, during a restoration procedure, a dentist may use multiple instruments simultaneous, which requires significant hand coordination. For posterior teeth, a stainless steel matrix is used for dental restoration procedures. A Mylar matrix may also be used. The stainless steel matrix is also used with a stabilizer such as a toefflemire retainer or a clamp/matrix system. Wedges are often made of plastic or wood and are stiff and can cause trauma to gingiva or gum tissue. Additionally, the use of a posterior matrix and these other instruments can be technique sensitive because it requires the coordination of multiple tools during a procedure. Further, even though it is flexible, it does have a sharp edge that can cause bleeding to occur when placed into the sulcus of the gingiva. Additionally, the Mylar matrix oftentimes is used in combination with a wedge or stabilizer such as a Toeffelmire retainer to help maintain the position of the matrix. The wedges can be used in order to ensure the matrix sufficiently seals off the restoration area of the tooth. These tools can be placed sub gingival. Wedges may also be traumatic to the gum tissue because they can cause the area to bleed and may impact the bond of the dentist's restorative material to the tooth. If a wedge or retainer/stabilizer is not used, the matrix may move during a restoration procedure. The retainers, wedge and stabilizers may be displaced by the patient's tongue, cheek, or lip as well as the operator. As a result, the dentist may hold the matrix with their non-dominant hand while completing the restoration. This coordination of tools can be difficult when the backside or palatal side of the tooth is also being restored. A dentist would not be able to hold the dental mirror and the matrix while placing the materials all at the same time. This coordination of tools is even more challenging when restoring posterior teeth. These tools can also be painful or very uncomfortable for the patient. Patients are oftentimes given a numbing agent to help tolerate pain during the procedure.

The various embodiments of the present disclosure relate to an improved matrix band that can expand and contract its diameter for positioning around a particular tooth. The embodiments also can prevent bonding materials (e.g., resin and other materials) from attaching to an adjacent tooth and help the dentist achieve a smooth finish for the tooth being operated on. Additionally, the embodiments can self-stabilize its position around a posterior tooth, which eliminates the need for other dental tools used in existing matrixes, such as wedges. Further, the embodiments are comprised of materials that cause less trauma on the gingiva (e.g., gums) of a patient, which results in less bleeding and irritation during a procedure. Additionally, various aspects of the embodiments address needs of composite restorations, such as a tight contact for sealing off a restoration area and a good contour of a posterior tooth.

Figure 1B:
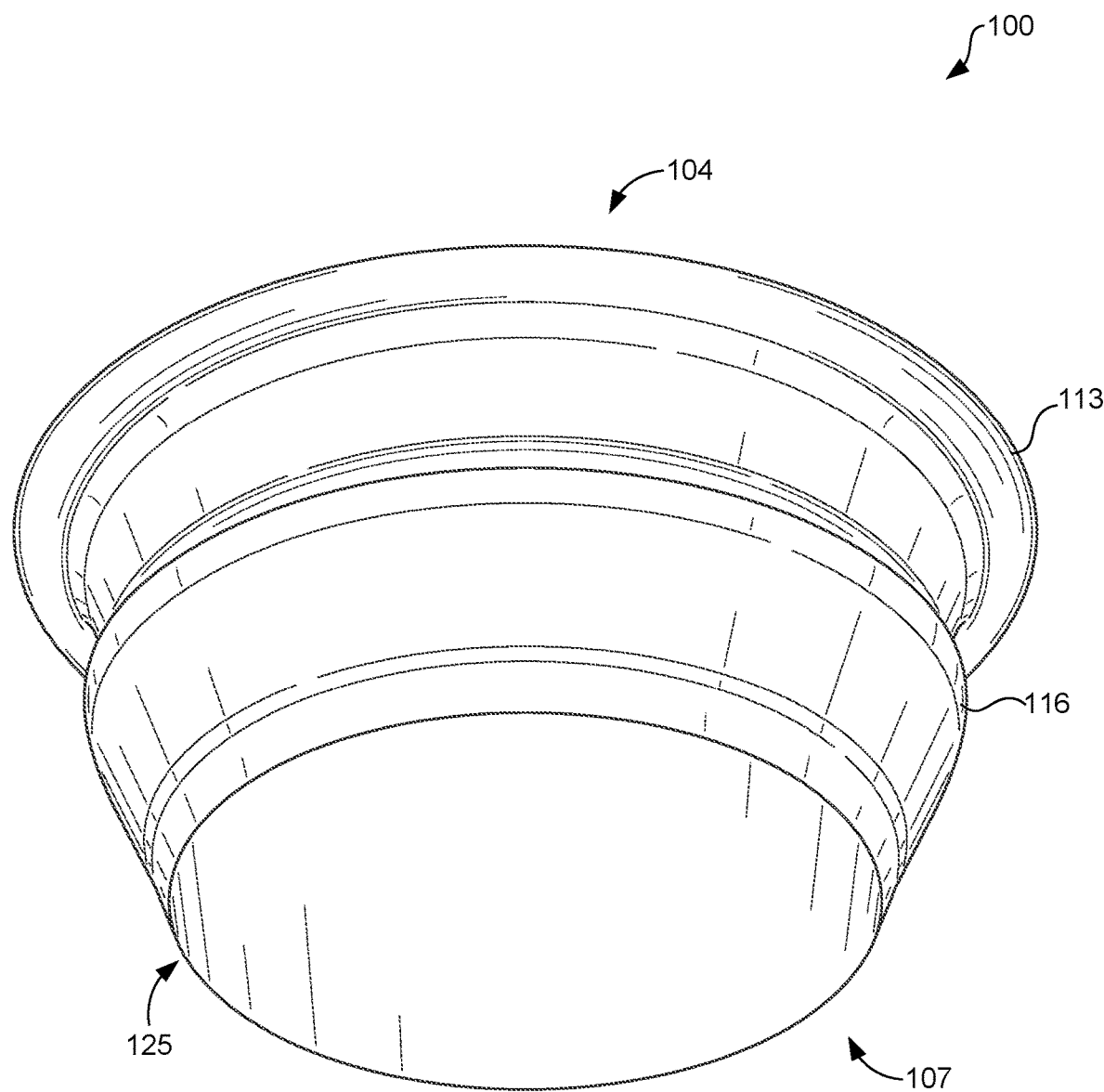
FIG. 1B is a second perspective view of the matrix band from FIG. 1A, according to one embodiment described herein.

With reference to FIGS. 1A and 1B, shown is matrix band 100 for dental restoration procedures of teeth. FIG. 1A illustrates a first perspective view of the matrix band 100, and FIG. 1B illustrates a second perspective view of the matrix band 100. The matrix band 100 has a first end 104 and a second end 107, in which an opening 110 extends from the first end 104 to the second end 107. The matrix band 100 also includes a first ridge 113, a second ridge 116, a side wall 119, and other suitable components. The matrix band 100 can be comprised of elastic material such as latex, silicone, polyethylene, polyvinyl chloride, polyurethane, thermal plastic rubber, thermoplastic polyurethane, and other suitable elastic materials.

In preparing for a tooth restoration, the matrix band 100 can be positioned around the targeted tooth. The targeted tooth may be an anterior tooth or a posterior tooth. The tooth restoration procedure may involve operating on a top portion of the crown or a side area of the crown. The matrix band 100 can be used to isolate the tooth from fluids during the restoration procedure. Particularly, the matrix band 100 can be used to create a seal from below the gum line to an upper portion of the crown of the tooth. The seal created by the matrix band 100 can prevent fluids, such as blood and saliva, from contacting areas involved in the restoration procedure.

Figure 5A:
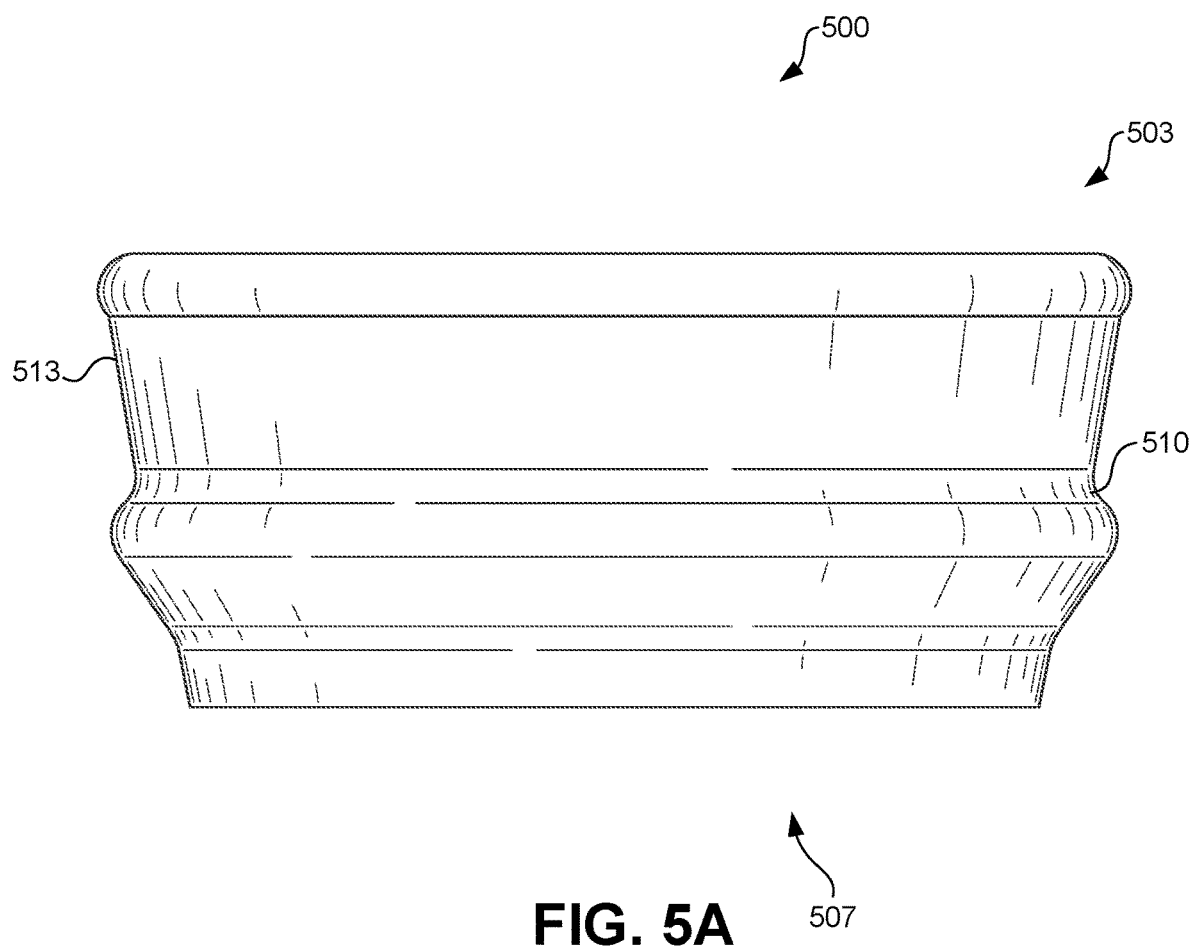
FIG. 5A illustrates a side view of another matrix band, according to one embodiment described herein.
Figure 5B:
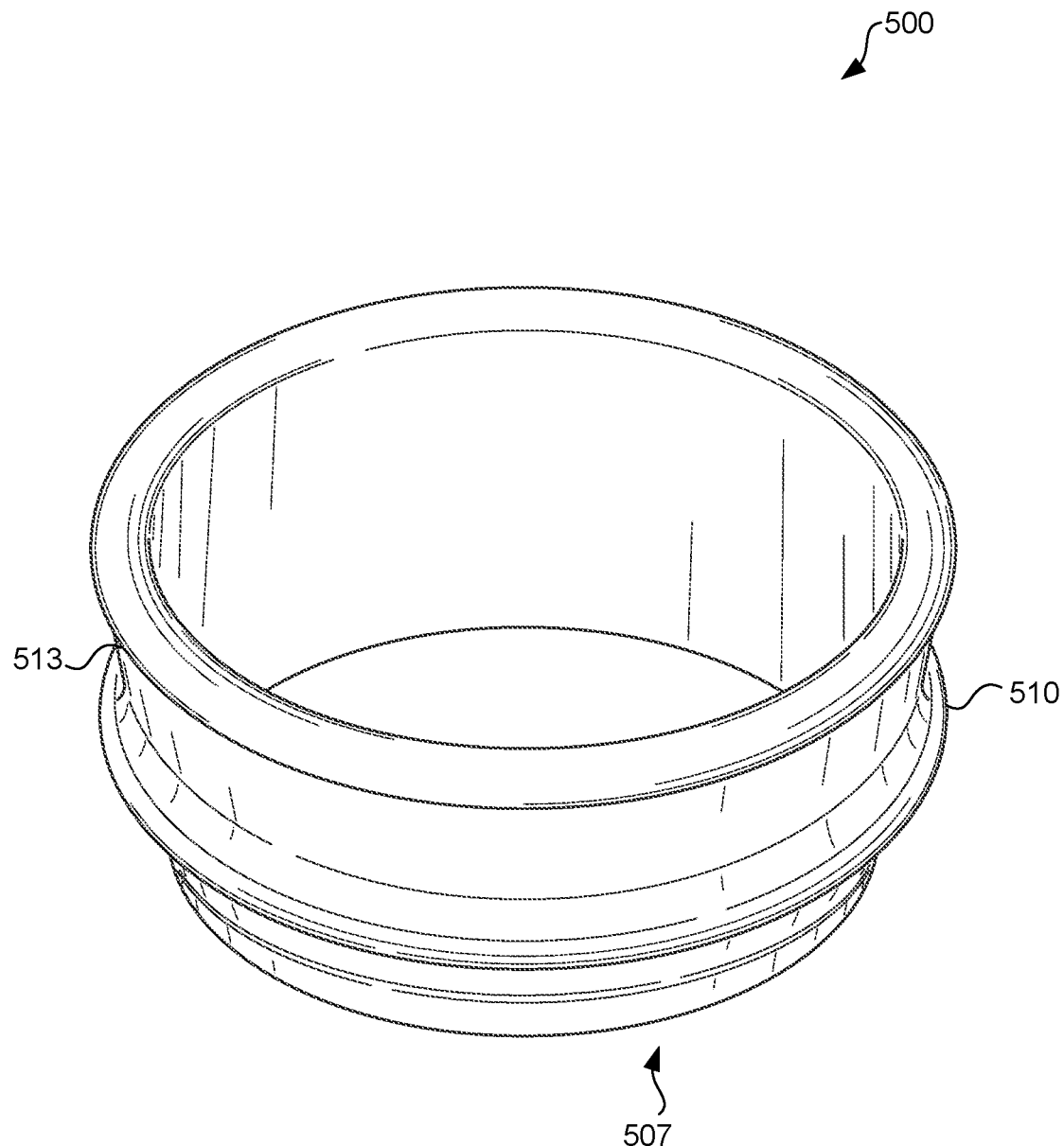
FIG. 5B illustrates a perspective view of the other matrix band in FIG. 5A, according to one embodiment described herein.

The first ridge 113 can be located at the first end of the matrix band 100. The first ridge 113 can also be considered as a lip or an edge for the matrix band 100. In some embodiments, the first ridge 113 may be omitted (FIGS. 5A and 5B). The first ridge 113 can be constructed in order to provide additional rigidity to the structure of the matrix band 100. In some examples, the first ridge 113 can be constructed by the first ridge 113 having a larger thickness than the side wall 119 of the matrix band 100 and the second end 107 of the matrix band 100. In some examples, the first ridge 113 can contact one or more adjacent teeth. In some scenarios, the thickness of the first ridge 113 can cause a displacement of one or more adjacent teeth away from the tooth surrounded by the matrix band 100. This separation can provide additional isolation for the tooth being restored, which can provide extra space for an operator performing the restoration procedure.

The second ridge 116 can be situated between the first end 104 and the second end 107. In some examples, the second ridge 116 can be positioned about mid-way between the first end 104 and the second end 107. The second ridge 116 can extend from the side wall 119. Similar to the first ridge 113, the second ridge 116 can have a larger thickness than the side wall 119 of the matrix band 100. The additional thickness can be used to contact and, in some cases, displace one or more adjacent teeth away from the tooth surrounded by the matrix band 100. In some examples, the second ridge 116 can contact the one or more adjacent teeth about mid-way between the top and bottom of the crown portion. As such, the second ridge 116 can contact an adjacent tooth at a different location than the first ridge 113.

The side wall 119 of the matrix band 100 can extend between the first end 104 and the second end 107. The side wall 119 can form a cylindrical shape that surrounds the opening 110. The opening 110 extends through the first end 104 and the second end 107. The matrix band 100 also has an interior wall 122 that surrounds the opening 110. In some examples, the interior wall 122 can have a vertical oriental. In other cases, the interior wall 122 may have a tapered surface, in which the portions of the tapered surface may be parallel to the portion of the side wall 119 on the exterior.

In some examples, the first end 104 of the matrix band 100 may include a cover, and the opening 110 can be accessible from the second end 107. As such, the targeted tooth would be inserted through the second end 107 of the matrix band 100.

Additionally, FIG. 1B illustrates that the second end 107 of the matrix band 100 can include a tapered region 125. The tapered region 125 can be inserted at or below a gum line of the tooth surrounded by the matrix band 100. The taper region 125 can have a thickness that is smaller than the side wall 119 (FIG. 2) and other portions of the matrix band 100. The smaller thickness can enable an easier process for inserting the tapered region 125 below the gum line. With a portion of the tapered region below the gum line, the matrix band 100 can form a full or partial fluid seal around the tooth. The seal can prevent fluids, such as blood and saliva, from contacting the region of the tooth being restored. In some examples, the matrix band 100 may have a different material for the tapered region 125, which may be even softer for further limiting trauma on the gum tissue.

Figure 2:
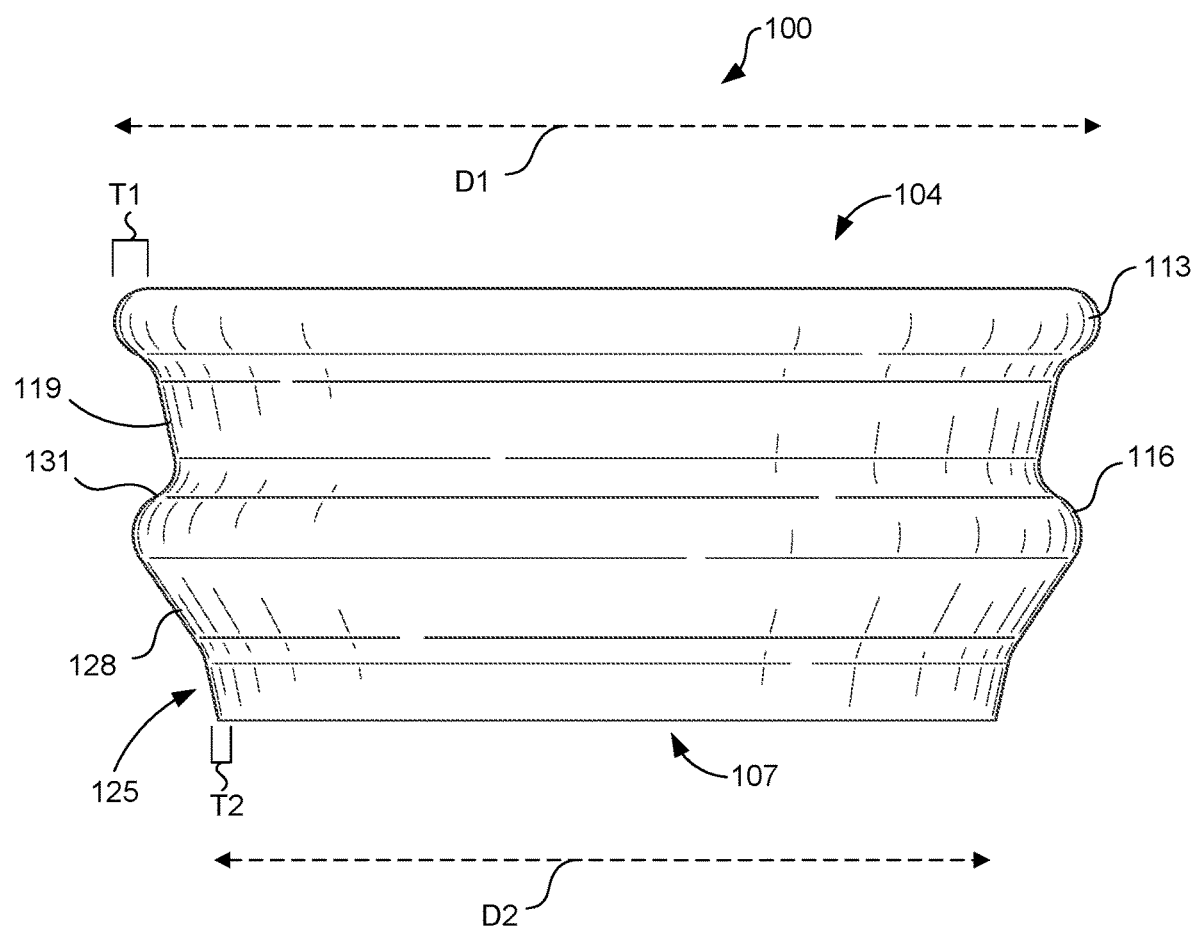
FIG. 2 is a side view of the matrix band from FIG. 1A, according to one embodiment described herein.

Next, FIG. 2 illustrates a side view of the matrix band 100. As illustrated, the first ridge 113 and the second ridge 116 can have a rounded exterior surface. It should be appreciated that the first ridge 113 and the second ridge 116 can have other exterior shapes. For example, in one embodiment, the second ridge 116 may form a protruding point.

As shown in FIG. 2, the second ridge 116 can comprise of a first slanted surface 128 and a second slanted surface 131, in which the two surfaces can have different slopes. The first slanted surface 128 can extend from the second end 107

(e.g., particularly the tapered region 125). In some embodiments, the tapered region 125 may be in a range of 0.5 to 1.5 millimeters in length from the second end 107 to the first slanted surface 128. The second slanted surface 131 can extend from the side wall 119.

As illustrated in FIG. 2, the side wall 119 can be recessed between the first ridge 113 and the second ridge 116. Additionally, as shown in FIG. 2, the side wall 119 can have a tapered surface. Further, the first end 104 of the matrix band 100 can have a first diameter "D1" that is larger than a second diameter "D2" for the second end 107 of the matrix band 100. In some embodiments, the first diameter "D1" can be in a range between 5 millimeters and 15 millimeters, and the second diameter "D2" can be in a range between 4 millimeters and 10 millimeters. For instance, in one example embodiment, the first diameter "D1" may be about 10.5 millimeters and the second diameter "D2" may be about 7.75 millimeters.

Further, as illustrated in FIG. 2, the respective diameter of the first ridge 113 substantially corresponds to the respective diameter of the second ridge 116. In some embodiments, the first ridge 113 may have a larger diameter than the second ridge 116 in order to configure a particular tapered shape for the matrix band 100.

Additionally, the first end 104 of the matrix band 100 has a first thickness T1 around its perimeter. The tapered region 125, at the second end 107, has a second thickness T2 around its perimeter. The first thickness T1 is larger than the second thickness T2. Even further, the second thickness T2 can be smaller than a respective thickness of the side wall 119. The elastic capability of the matrix band 100 enables for it to expand its diameter for placement around a tooth in an expanded state. Then, once positioned around the tooth, the matrix band 100 can contract and adhere to the exterior contour of the tooth. The matrix band 100 can self-stabilize its position around the tooth because the elastic material enables for it to adhere to the exterior of the tooth and because of the placement of the tapered region 125 below the gum line.

Figure 3:
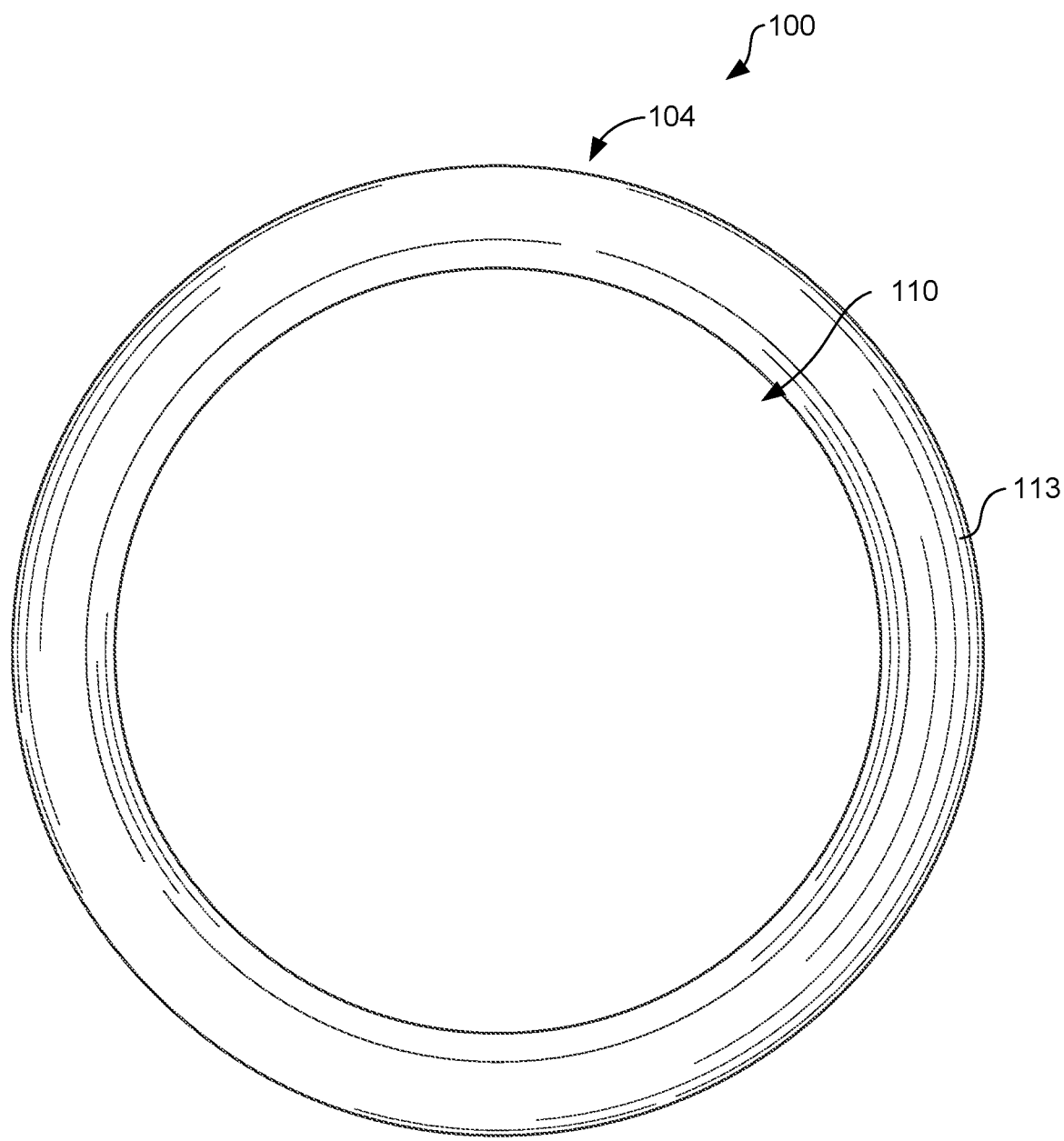
FIG. 3 illustrates a top view of the matrix band from FIG. 1A, according to one embodiment described herein.
Figure 4:
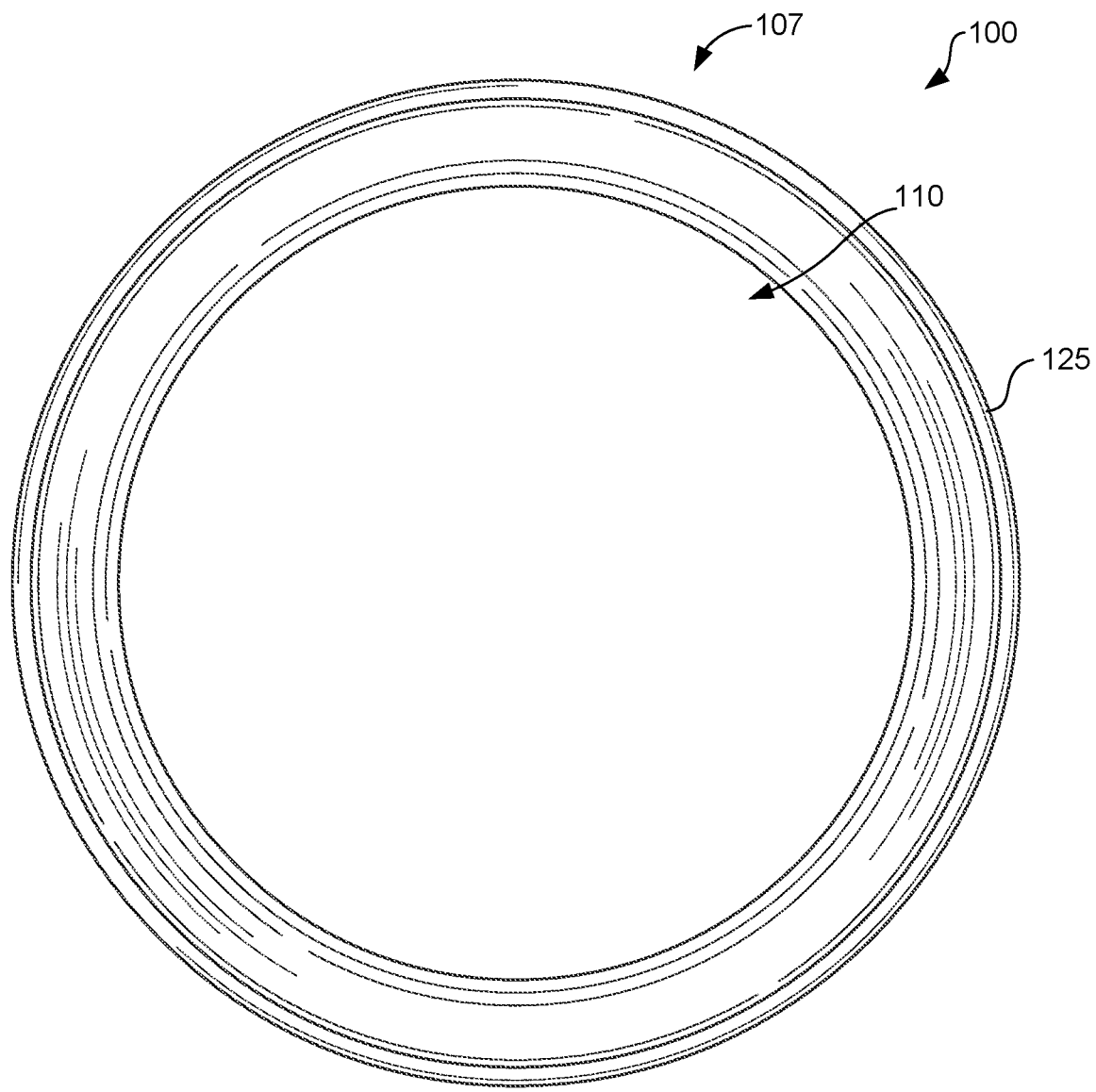
FIG. 4 illustrates a bottom view of the matrix band from FIG. 1A, according to one embodiment described herein.

With reference to FIG. 3, shown is a top view of the matrix band 100 from the first end 104. As illustrated, the opening 110 extends from the first end 104 through to the second end 107 (FIG. 1A). FIG. 4 illustrates a bottom view of the matrix band 100 from the second end 107. Particularly, the tapered region 125 is illustrated in FIG. 4.

Next, FIGS. 5A and 5B illustrate another example of a matrix band 500. FIG. 5A illustrates a side view of the matrix band 500, and FIG. 5B illustrates a perspective view of the matrix band 500. The matrix band 500 can include a first end 503 and a second end 507. The matrix band 500 includes a ridge 510 between the first end 503 and the second end 507. In contrast to the earlier examples, the matrix band 500 does not have a first ridge 113 at an end, as illustrated in FIG. 1A. Instead, the matrix band 500 includes a side wall 513 that extends to the first end 503.

Figure 6:
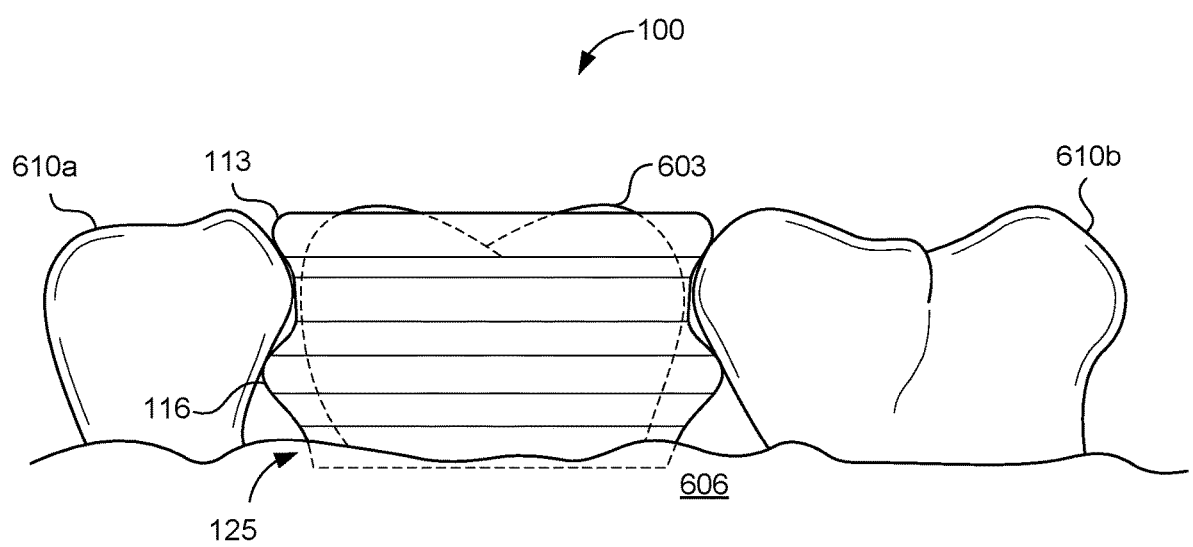
FIG. 6 illustrates a side view of the matrix band of FIG. 5A positioned around a posterior tooth, according to one embodiment described herein.

With reference to FIG. 6, shown is a side view of the matrix band 100 positioned around a posterior tooth 603. As illustrated, a portion of the tapered region 125 of the matrix band 100 has been positioned below the gingiva 606 (e.g., below the gum line). The elastic material of matrix band 100, specifically the tapered region 125, is at least an improvement over the existing solution because it causes less trauma to the gingiva 606 than existing solutions. Specifically, the elastic material has a softer surface and is not as sharp as existing solutions. Accordingly, the gingiva 606 is less likely to bleed and become irritated. As a result, the patient has a better experience during the dental restoration procedure.

In some non-limiting examples, the first ridge 113 and/or the second ridge 116 can be used to self-stabilize the matrix band 100. The first ridge 113 and/or the second ridge 116 can stabilize the matrix band 100 by contacting one or more adjacent teeth (610a and 610b). Additionally, the portion of the tapered region 125 below the gum line also helps stabilize and seal the posterior tooth 603 from fluids.

Next, a general description of the operation of the various embodiments of the matrix band 100 is provided. To begin, in this example, a patient is seeking assistance with a dental restoration of a posterior tooth. The dentist can identify a size of the posterior tooth 603, which may involve identifying a posterior tooth diameter, a circumference of the posterior tooth 603, or some other suitable dimension associated with a posterior tooth 603. The tooth dimensions can assist the dentist in identifying a matrix band 100 that will fit and sufficiently conform to the shape of the tooth. In some embodiments, the embodiments of the matrix band 100 can be manufactured with different diameters.

After selecting an appropriately sized matrix band 100, the dentist can use a dental instrument with two pronged members, such as a hemostat, Howe Plier, Crown remover plier, separator pliers or elastic separator pliers, and other suitable instruments. Each prong can be inserted into the interior of the matrix band 100 through the opening 110. The dental instrument can be used to contact the interior wall 122 at two different, opposing locations. The prongs for the dental instrument can be moved in opposing directions against the interior wall 122. The force applied by the dental instrument can cause the elastic material of the matrix band 100 to expand. Accordingly, the diameter of the matrix band 100 can expand. In this non-limiting example, prior to applying the force, the matrix band 100 may have a first diameter that is smaller than a diameter of the posterior tooth 603 or substantially equal in diameter to the posterior tooth 603. While in the expanded state, the matrix band 100 has a second diameter that is larger than the diameter of the posterior tooth.

In other examples, the dentist can use their hands to pull opposing portions of the matrix band 100 away from each other in order to expand the diameter of the matrix band 100. It should be appreciated that other methods or techniques can be used to manipulate the matrix band 100 to an expanded state.

In an expanded state, the dentist can proceed to place the matrix band 100 around the posterior tooth 603. The dentist can insert the tooth through the second end 107 of the matrix band 100. The tapered region 125 of the matrix band 100 can be positioned below a gum line of the posterior tooth 603. The placement of the matrix band 100 can create a fluid seal around the tooth in order to prevent fluids from contacting the posterior tooth 603, particularly the area being operated on for restoration. As such, the dentist can perform a dental restoration procedure in a sealed area for the posterior tooth 603, which enables the restoration procedure to be conducted in a dry environment. As illustrated in FIG. 6, the first ridge 113 and the second ridge 116 are contacting the adjacent teeth 610a, 610b at different locations. In some embodiments, the first ridge 113 and/or the second ridge 116 can apply a force against the adjacent teeth 610a, 610b, which may cause some displacement of the adjacent teeth 610a, 610b away from the posterior tooth 603. Additionally, the elastic material of the matrix band 100 can allow for portions of the matrix band 100 to be adjusted. For example, a top portion of the matrix band 100 can be lowered to expose a portion of the posterior tooth 603. In some scenarios, the dentist may need to operate on a side portion of the posterior tooth 603 and the dentist can force the first ridge 113 in a downward direction toward the tapered region 125. By forcing the first ridge 113 and the associated area near the first ridge 113 down, the dentist may have access to a top or side portion of the posterior tooth 603.

Figure 7:
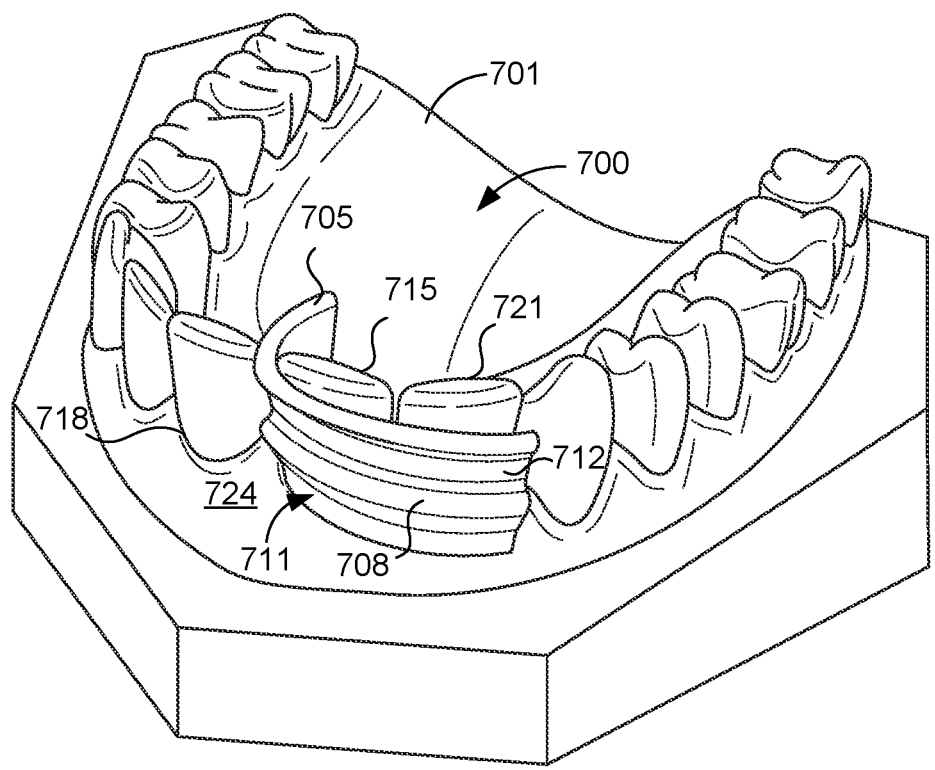
FIG. 7 illustrates a perspective view of a strip matrix band positioned in a lower jaw of a mouth, according to one embodiment described herein.

With reference to FIG. 7, shown is another matrix band 700 in a strip form inserted between two teeth in a lower jaw 701 of a mouth. Matrix band 700 can be useful for preventing fluids from contacting portions of anterior teeth. It should be noted that the matrix band 700 can have several similar features as compared to the matrix band 100 from FIGS. 1A and 1B. Matrix band 700 can represent an elongated version, such as in a strip form factor. In other words, the matrix band 700 is different from the matrix band 100 (FIGS. 1A and 1B) because it does not have a circular shape. As such, the matrix band 700 does not completely surround a tooth as illustrated in FIG. 7. Instead, matrix band 700 can be manipulated to substantially wrap around one or more teeth.

As illustrated in the example embodiment, the matrix band 700 can include a first ridge 705, a second ridge 708, a tapered region 711, a recessed side wall 712 and other suitable components. As previously noted, matrix band 700 can be useful for substantially wrapping around one or more anterior teeth. For example, the matrix band 700 can be inserted between two teeth 715, 718. In some cases, the matrix band 700 can be inserted similar to inserting a piece of floss. The dentist can manipulate the matrix band 700 to substantially wrap around a portion of tooth 715 and tooth 721. A portion of the tapered region 711 can be inserted below a gum line 724.

Figure 8:
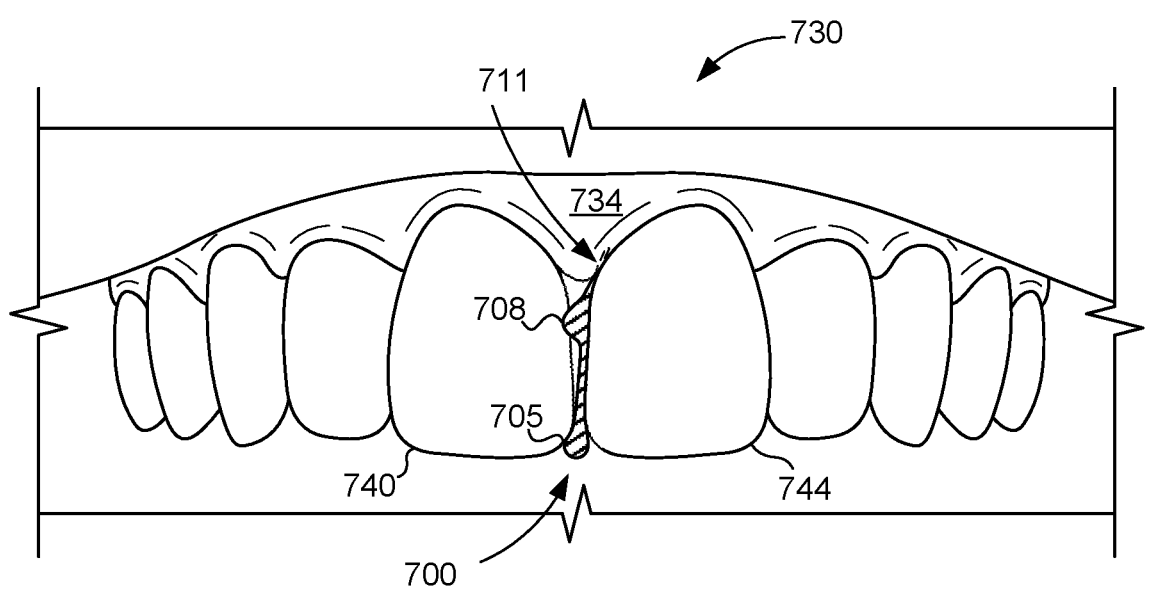
FIG. 8 illustrates the strip matrix band of FIG. 7 positioned between anterior teeth in an upper jaw of a mouth, according to one embodiment described herein.

Next, FIG. 8 illustrates a cross-section view of the matrix band 700 from FIG. 7 positioned between two anterior teeth in an upper jaw 730 of a mouth. The tapered region 711 of the matrix band 700 is positioned between under the gum line 734. Additionally, the first ridge 705 and the second ridge 708 are in contact with adjacent tooth 740. In this scenario, the matrix band 700 can be manipulated to wrap substantially around tooth 744 and others.

Figure 9:
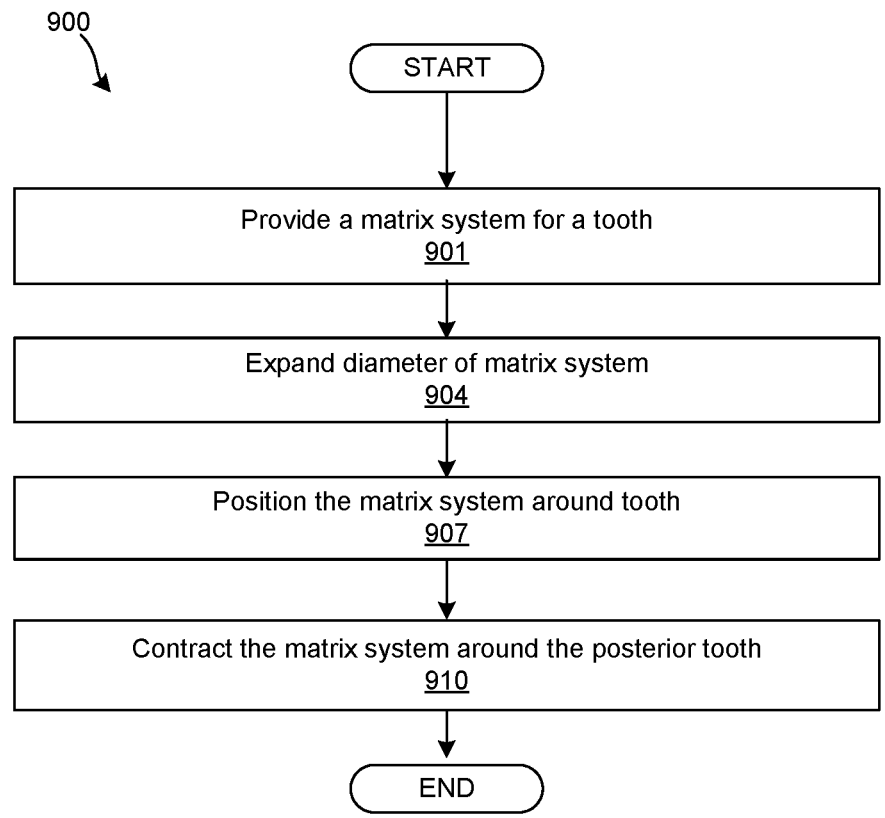
FIG. 9 is a flow chart illustrating an example method of use of the matrix band from FIG. 1A, according to various embodiments of the present disclosure.

With reference to FIG. 9, shown is a flowchart that provides one example of a method of use for the matrix band 100 from FIG. 1A, the matrix band 500 from FIG. 5A, or the matrix band 700 from FIG. 7 according to various embodiments.

Beginning with box 901, the process 900 involves providing a matrix band 100 for a posterior tooth. The matrix band 100 can be selected based on a diameter of a tooth. The matrix band 100 can be an elastic circular band that has a first end and a second end. The matrix band 100 can have an opening at the second end. The first end can have a larger diameter than the second end. The matrix band 100 can be configured to expand in order to situate the matrix band 100 around a tooth and configured to contract in order to adhere to the tooth.

In box 904, the process 900 involves expanding the diameter of the matrix band 100. For example, a dentist may move a first perimeter portion of the matrix band 100 away from a second portion of the matrix band 100. In other examples, a dentist may use a dental instrument, such as a hemostat, Howe Plier, Crown remover plier, separator pliers or elastic separator pliers, and other suitable instruments. Some dental instruments may include two prong members that can be positioned in the interior of the matrix band 100 by way of the opening 110. The dentist can manipulate the instrument to move the prongs away from each other, which applies a force on the interior of the matrix band 100 to expand in opposing directions.

In another example, the dentist can insert two separate pieces of string (e.g., floss) through the opening 110 of the matrix band 100. The dentist can take the two ends of a first string in one hand and take the two ends of a second string in the other hand. The dentist can pull the two strings in opposing directions in order to stretch the matrix band 100, which causes the diameter of the matrix band 100 to expand. It should be noted that there are other methods of manipulating the matrix band 100 into an expanded state.

In box 907, the process 900 involves positioning the matrix band 100 around a tooth intended for restoration while the matrix band 100 is an expanded state. In some examples, the positioning the matrix band 100 may involve inserting the tooth through the opening from the second end 107 of the matrix band 100. Additionally, the matrix band 100 can be positioned by inserting the second end 107 of the matrix band 100 at or below the gum line of the tooth. For example, the dentist may move the tapered region 125 along the crown of the tooth, and then insert at least a portion of the tapered region 125 below the gum line.

In box 910, the process 900 involves contracting the matrix band 100 in order for the matrix band 100 to adhere to the tooth. In some examples, the matrix band 100 can transition from the expanded state to a contracted state by releasing the force applied to the matrix band 100. For example, the dentist may release the pressure applied to the two-prong dental instrument in order to allow the matrix band 100 to contract. In the previous string example, the dentist can release the tension from pulling the two strings (e.g., floss) in opposing directions in order to allow the diameter of the matrix band 100 to contract. It should be noted the method of contracting the matrix band 100 can vary.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. An apparatus for performing a dental restoration process, comprising:
    an elastic circular band that has a first end and a second end, the elastic circular band having an opening at the second end, the first end having a larger diameter than the second end, the elastic circular band is configured to expand in order to situate the elastic circular band around a tooth and contract in order to adhere to the tooth;

a ridge that is positioned between the first end and the second end of the elastic circular band, the ridge being configured to apply a force to and displace an adjacent tooth; and a tapered region at the second end, wherein when the elastic circular band is positioned around the tooth, the tapered region is configured to create a fluid seal at or below a gum line of the tooth.

2. The apparatus of claim 1, wherein the ridge comprises a first ridge, and the apparatus further comprises a second ridge at the first end.

3. The apparatus of claim 2, wherein when the elastic circular band is positioned around the tooth, the first ridge contacts the adjacent tooth at a first location of the adjacent tooth, and the second ridge contacts the adjacent tooth at a second location of the adjacent tooth.

4. The apparatus of claim 1, wherein a first thickness of the first end of the elastic circular band is greater than a second thickness of the second end of the elastic circular band.

5. The apparatus of claim 1, wherein when the elastic circular band is positioned around the tooth, the elastic circular band conforms to a shape of the tooth.

6. The apparatus of claim 1, wherein the ridge comprises a slanted surface that extends from the second end.

7. The apparatus of claim 6, wherein the slanted surface is a first slanted surface, and the ridge comprises a second slanted surface that has a different slope than the first slanted surface.

8. The apparatus of claim 1, wherein the elastic circular band has a tapered shape.

9. The apparatus of claim 1, wherein the opening extends from the second end to the first end.

10. The apparatus of claim 1, wherein the tooth is a posterior tooth.

11. The apparatus of claim 1, wherein the elastic circular band has a recessed surface between the ridge and the first end.

12. The apparatus of claim 1, wherein the elastic circular band is comprised of at least one of latex, silicone, polyethylene, polyvinyl chloride, polyurethane, thermal plastic rubber, and thermoplastic polyurethane.

13. A method of installing an elastic matrix band for a dental restoration procedure, the method comprising:

providing an elastic circular band for a tooth, wherein the elastic circular band has a first end and a second end, the elastic circular band having an opening at the second end, the elastic circular band having a ridge positioned between the first end and the second end;

expanding a diameter of the elastic circular band by moving a first perimeter portion of the elastic circular band away from a second perimeter portion of the elastic circular band;

positioning the elastic circular band around the tooth by inserting the tooth through the opening at the second end; and releasing the first perimeter portion of the elastic circular band in order for the elastic circular band to contract and adhere to an exterior surface of the tooth, the ridge being configured to apply a force to and move an adjacent tooth.

14. The method of claim 13, wherein positioning the elastic circular band further comprises inserting the second end of the elastic circular band substantially at or below a gum line of the tooth.

15. The method of claim 14, wherein the second end comprises a tapered end that is inserted below the gum line of the tooth.

16. The method of claim 13, wherein the elastic circular band comprises a slanted surface that extends from the ridge, the slated surface extends to a tapered region.

17. The method of claim 13, wherein positioning the elastic circular band around the tooth creates a fluid seal below a gum line around the tooth.

18. The apparatus of claim 1, wherein the tapered region is configured to stabilize a position of the elastic circular band.

19. A dental restoration apparatus, comprising:

an elastic matrix band that has a top edge and a bottom edge, the elastic matrix band being configured to expand and contract;

a first ridge that is positioned closer to the bottom edge, the first ridge being configured to apply a force to and displace an adjacent tooth;

a second ridge that is positioned closer to the top edge; and a tapered region that is positioned at the bottom edge, the tapered region being configured to be positioned at or below a gum line and being configured to stabilize a position of the elastic matrix band.

* * * * *